United States Patent [19]

Keogh

[11] 4,404,349

[45] Sep. 13, 1983

[54] POLYSILOXANES HAVING COMBINED THEREIN ORGANO TITANATES

[75] Inventor: Michael J. Keogh, Bridgewater, N.J.

[73] Assignee: Union Carbide Corporation, Danbury, Conn.

[21] Appl. No.: 334,046

[22] Filed: Dec. 23, 1981

Related U.S. Application Data

[63] Continuation-in-part of Ser. No. 192,319, Sep. 30, 1980, Pat. No. 4,328,323, which is a continuation-in-part of Ser. No. 70,785, Aug. 29, 1979, Pat. No. 4,291,136, which is a continuation-in-part of Ser. No. 892,153, Mar. 31, 1978, abandoned.

[51] Int. Cl.³ ............... C08G 77/06; C08G 77/18
[52] U.S. Cl. ........................... 528/25; 525/475; 525/102; 525/106
[58] Field of Search ................ 528/25; 525/475

[56] References Cited

U.S. PATENT DOCUMENTS

| | | | |
|---|---|---|---|
| 2,716,656 | 8/1955 | Boyd | 528/25 |
| 3,057,822 | 10/1962 | Rust et al. | 525/475 |
| 3,193,567 | 7/1965 | Rossmy | 556/443 |
| 3,644,566 | 2/1972 | Kincheloe et al. | 525/101 |
| 3,687,882 | 8/1972 | Bishop | 528/25 |

OTHER PUBLICATIONS

M. G. Volonkov et al. *Siloxane Bond*, Siberian Division of the USSR Academy of Sciences (1976) pp. 221–222.

Rossmy et al. *1,2–Siloxacycloalkanes* part 1: Synthesis and Polymerization Properties (1963).

*Primary Examiner*—Wilbert J. Briggs, Sr.
*Attorney, Agent, or Firm*—James C. Arvantes; Robert C. Brown

[57] ABSTRACT

The disclosure of this application is directed to a polysiloxane, having combined therein an organo titanate, which can be used in the production of silane modified alkylene-alkyl acrylate copolymers. The silane modified copolymers can be extruded about electrical conductors to provide insulation thereon characterized by improved surface characteristics.

21 Claims, No Drawings

POLYSILOXANES HAVING COMBINED THEREIN ORGANO TITANATES

This application is a continuation-in-part of copending application Ser. No. 192,319 filed Sept. 30, 1980, now U.S. Pat. No. 4,328,323 which in turn is a continuation-in-part of application Ser. No. 70,785 filed Aug. 29, 1979, now U.S. Pat. No. 4,291,136 which in turn is a continuation-in-part of application Ser. No. 892,153 filed Mar. 31, 1978, now abandoned.

SUMMARY OF THE INVENTION

This application relates to polysiloxanes having combined therein an organo titanate, which can be used in the production of silane modified alkylene-alkyl acrylate copolymers, by reaction with an alkylene-alkyl acrylate copolymer. The silane modified alkylene-alkyl acrylate copolymers can be extruded about electrical conductors and water cured, if so desired, to crosslinked products, providing coverings thereon characterized by improved surface characteristics.

BACKGROUND OF THE INVENTION

Water-curable, silane modified copolymers of alkylene-alkyl acrylates and a process for the preparation thereof by reacting a mixture containing a silane and an alkylene-alkyl acrylate copolymer are described in detail in my U.S. Pat. No. 4,291,136 granted Sept. 22, 1981. The silane modified copolymers, as described in this patent, can be extruded about electrical conductors such as wire and cable and water-cured to crosslinked products to provide insulation thereon of excellent quality.

It is customary, prior to extruding silane modified alkylene-alkyl acrylate copolymers about wire and cable, to insure removal therefrom of undesirable volatiles. The presence of undesirable volatiles could lead to the formation of voids in the extruded insulation, marring the appearance of the final insulated product and, in some instances, shortening its working life. In addition, removal of undesirable volatiles from the silane modified copolymers reduces odor problems at the extruder and in the insulated wire or cable. Obviously, removal of volatiles from the silane modified copolymers, by a subsequent devolatilization step after the preparation of the copolymers, increases the time required to produce an insulated product and, also, increases the overall cost thereof.

DESCRIPTION OF THE INVENTION

The present invention provides for the production of silane modified copolymers of alkylene-alkyl acrylates, which are free of undesirable volatiles and consequently need not be subjected to a subsequent devolatilization step, by reacting an alkylene-alkyl acrylate copolymer with a polysiloxane having combined therein an organo titanate. The silane modified copolymers, prepared in accordance with the present invention, can be directly extruded about wires and cables and water-cured to crosslinked products to provide insulation thereon, free of undesirable voids and odors.

The polysiloxanes, having combined therein an organo titanate, which are reacted with alkylene-alkyl acrylate copolymers to produce water-curable, silane modified alkylene-alkyl acrylate copolymers contain repeating units of the formula:

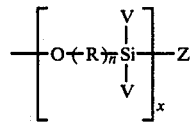

Formula I wherein R is a hydrocarbon radical or an oxy substituted hydrocarbon radical; each V, which cam be the same or different, is hydrogen, a hydrocarbon radical or a hydrolyzable group; Z is a hydrolyzable group; n is an integer having a value of one to 18 inclusive and x is an integer having a value of at least 2, generally 2 to 1000 inclusive, preferably 5 to 25 inclusive.

Illustrative of suitable hydrocarbon radicals for R are alkylene radicals having one to 18 carbon atoms inclusive, preferably one to 6 carbon atoms inclusive, such as methylene, ethylene, propylene, butylene, hexylene and the like; oxy substituted hydrocarbon radicals exemplified by alkoxy radicals having one to 18 carbon atoms inclusive, preferably one to 6 carbon atoms inclusive such as methyloxymethyl, methyloxypropyl, ethyloxyethyl, ethyloxylpropyl, propyloxypropyl, propyloxybutyl, propyloxyhexyl and the like.

As stated, each V can be hydrogen, a hydrocarbon radical or a hydrolyzable group. Illustrative of suitable hydrocarbon radicals are alkyl radicals having one to 18 carbon atoms, preferably one to 6 carbon atoms inclusive such as methyl, ethyl, n-propyl, isopropyl, n-butyl, n-hexyl and the like; alkoxy radicals having one to 18 carbon atoms inclusive, preferably one to 12 carbon atoms inclusive, such a methoxy, ethoxy, propoxy, hexoxy, dodecyloxy, methoxyethoxy and the like; aryl radicals having 6 to 8 carbon atoms inclusive such as phenyl, methylphenyl, ethylphenyl and the like; cycloaliphatic radicals having 5 to 8 carbon atoms inclusive such as cyclopentyl, cyclohexyl, cyclohexyloxy and the like.

Z, as previously stated, is a hydrolyzable group among which can be noted alkoxy radicals as previously described for V and R; oxyaryl radicals such as oxyphenyl and the like; oxyaliphatic radicals such as oxyhexyl and the like; halogens such as chlorine and the like and other hydrolyzable groups as further described in U.S. Pat. No. 3,408,420 to John B. Wiggill patented Oct. 29, 1968.

Organo titanate modified polysiloxanes are conveniently prepared by reacting a mixture containing a silane falling within the scope of Formula II with an organo titanate falling within the scope of Formula III.

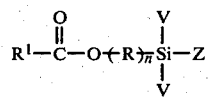

Formula II wherein $R^1$ is a hydrocarbon radical, as for example, an alkyl radical having one to 18 carbon atoms inclusive, preferably one to four carbon atoms inclusive such as methyl, ethyl, n-propyl, isopropyl, n-butyl and the like; alkylene radicals having two to 18 carbon atoms inclusive, preferably two to 4 carbon atoms inclusive such as ethylene, propylene and the like; aryl radicals having six to ten carbon atoms inclusive such as phenyl, benzyl and the like. Other variables are as previously defined.

Exemplary of suitable silanes falling within the scope of Formula II are the following:

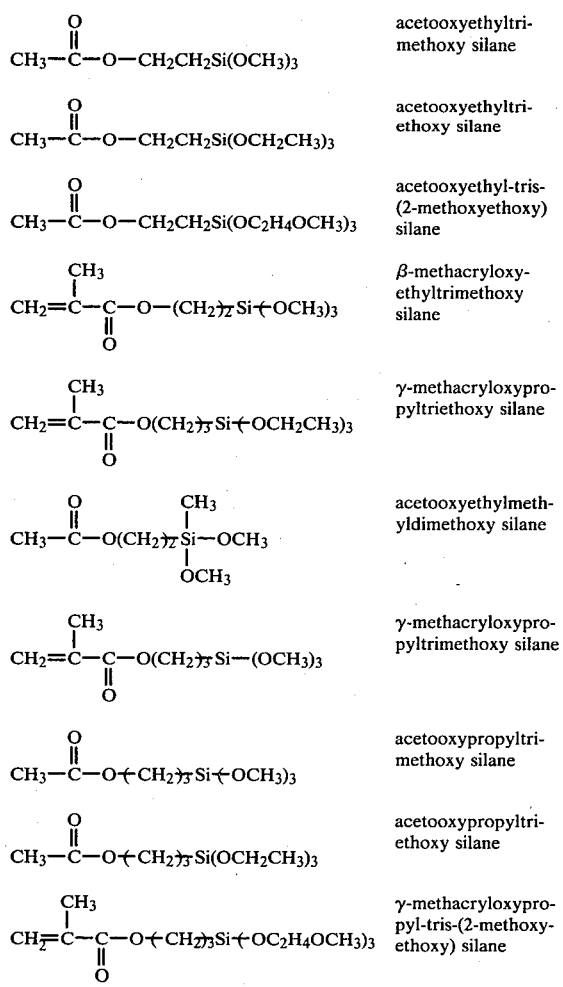

| Structure | Name |
|---|---|
| $CH_3-C(=O)-O-CH_2CH_2Si(OCH_3)_3$ | acetooxyethyltrimethoxy silane |
| $CH_3-C(=O)-O-CH_2CH_2Si(OCH_2CH_3)_3$ | acetooxyethyltriethoxy silane |
| $CH_3-C(=O)-O-CH_2CH_2Si(OC_2H_4OCH_3)_3$ | acetooxyethyl-tris-(2-methoxyethoxy) silane |
| $CH_2=C(CH_3)-C(=O)-O-(CH_2)_2Si(OCH_3)_3$ | β-methacryloxyethyltrimethoxy silane |
| $CH_2=C(CH_3)-C(=O)-O(CH_2)_3Si(OCH_2CH_3)_3$ | γ-methacryloxypropyltriethoxy silane |
| $CH_3-C(=O)-O(CH_2)_2Si(CH_3)(OCH_3)OCH_3$ | acetooxyethylmethyldimethoxy silane |
| $CH_2=C(CH_3)-C(=O)-O(CH_2)_3Si(OCH_3)_3$ | γ-methacryloxypropyltrimethoxy silane |
| $CH_3-C(=O)-O(CH_2)_3Si(OCH_3)_3$ | acetooxypropyltrimethoxy silane |
| $CH_3-C(=O)-O(CH_2)_3Si(OCH_2CH_3)_3$ | acetooxypropyltriethoxy silane |
| $CH_2=C(CH_3)-C(=O)-O(CH_2)_3Si(OC_2H_4OCH_3)_3$ | γ-methacryloxypropyl-tris-(2-methoxyethoxy) silane |

$$Ti(OR^2)_4 \qquad \text{Formula III}$$

wherein each $R^2$, which can be the same of different, is hydrogen or a hydrocarbon radical having one to 18 carbon atoms inclusive, preferably one to 14 carbon atoms inclusive. (To be a titanate at least one $R^2$ has to be a hydrocarbon radical).

Exemplary of suitable hydrocarbon radicals are alkyl radicals such as methyl, ethyl, n-propyl, isopropyl, butyl, octyl, lauryl, myristyl, stearyl and the like, cycloaliphatic radicals such as cyclopentyl, cyclohexyl and the like, aryl radicals such as phenyl, ethylphenyl, chlorophenyl and the like; alkaryl radicals such as benzyl and the like.

Particularly desirable titanates falling with the scope of Formula III are those wherein each $R^2$ is alkyl having one to 18 carbon atoms inclusive, preferably one to 14 carbon atoms inclusive, exemplified by tetrabutyl titanate, tetraisopropyl titanate and the like.

Organo titanates falling with the scope of Formula III are known compounds and can be conveniently prepared as described in U.S. Pat. No. 2,984,641 to Leon E. Wolinski patented May 16, 1961.

Other suitable organo titanates are the organo titanium chelates such as tetraoctylene glycol titanium, triethanol amine titanate, titanium acetyl acetonate, titanium lactate and the like.

At least a catalytic amount of organo titanate is used to produce the organo titanate modified polysiloxanes, that is an amount sufficient to catalyze the condensation and polymerization reaction to produce a polysiloxane. As a rule, the amount of organo titanate used is on the order of about 0.001 to about 25 percent by weight based on the weight of the monomeric silane. It is preferred to use about 0.5 to about 5 percent by weight of organo titanate based on the weight of the monomeric silane.

Preferred polysiloxanes have a viscosity of about 0.5 poise to about 150 poise, preferably about one to about 20 poise as determined by a Gardner-Holt bubble viscometer at a temperature of 25° C.

The temperature at which the reaction is conducted can be varied over a wide range, for example from about 0° C. to about 250° C. A temperature in the range of about 70° C. to about 130° C. is preferred. Also the reaction can be conducted using a suitable solvent, illustrated by hydrocarbon solvents such as toluene, xylene, cumene, decaline, dodecane, chlorobenzene and the like.

The reaction between the organo titanate and the monomeric silane can be conducted under atmospheric, subatmospheric or superatmospheric pressure. It is preferred to conduct the later stages of the reaction under subatmospheric pressure to allow for more facile removal of volatile by-products. Also, the reaction is preferably conducted under the atmosphere of an inert gas such as nitrogen or argon to avoid formation of a gel due to the water sensitivity of the product.

Control of the repeating unit, Formula I, of the polysiloxane can be effected by introducing an end blocker, as for example, a high boiling ester into the reaction mixture, at the beginning of the reaction or at any convenient point in the reaction process.

The number of repeating units of the polysiloxane is equal to the mole ratio of the monomeric silane to the end blocker as exemplified by the following simplified reaction scheme wherein the silane is shown to be acetooxyethyltrimethoxy silane and the high boiling ester is shown to be methyl benzoate.

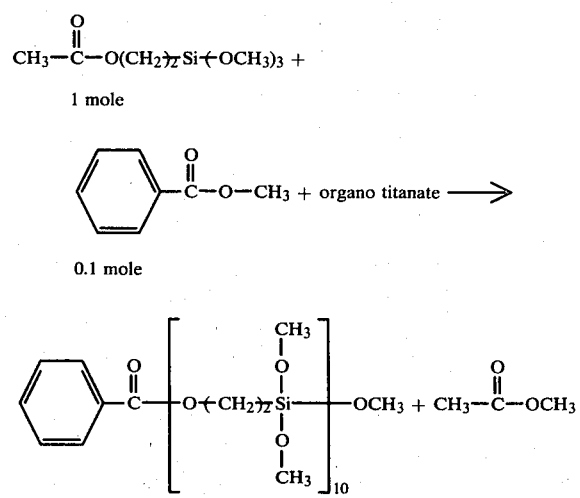

Suitable end blockers have the general formula $$R^3-C-O-R^3$$
$$\underset{O}{\overset{\|}{}}$$

wherein each $R^3$, which can be the same or different, is a hydrocarbon radical as defined for $R^2$.

Completion of the reaction is evidenced by cessation of the evolution of volatiles and the weight/volume of volatiles collected as compared to the theoretical weight/volume. Alternatively, the reaction can be run to a desired viscosity level and the reactants cooled to stop the reaction.

The alkylene-alkyl acrylate copolymers with which the polysiloxanes are reacted to form the silane modified copolymers are known copolymers produced by reacting an alkene with an alkyl acrylate.

Suitable alkenes are ethylene, propylene, butene-1, hexene-1, heptene-1, octene-1 and the like.

The alkylene moiety of the alkylene-alkyl acrylate copolymer generally contains from 2 to 18 carbon atoms inclusive, preferably 2 to 3 carbon atoms inclusive and mixtures thereof.

Suitable alkyl acrylate monomers which are copolymerized with the alkenes fall within the scope of the following formula:

$$CH_2=\underset{\underset{OR^5}{|}}{\overset{\overset{R^4}{|}}{C}}-C=O \qquad \text{Formula IV}$$

wherein $R^4$ is hydrogen or methyl and $R^5$ is alkyl having one to 8 carbon atoms inclusive. Illustrative compounds encompassed by this formula are: methyl acrylate, ethyl acrylate, t-butyl acrylate, methyl methacrylate, n-butyl acrylate, n-butylmethacrylate, 2-ethylhexyl acrylate chloroethyl acrylate and the like, and mixtures thereof.

Alkylene-alkyl acrylate copolymers generally have a density (ASTM D 1505 with conditioning as in ASTM D 147-72) of about 0.92 to about 0.94 and a melt index (ASTMD-1238 at 44 psi tested pressure) of about 0.5 to about 500 decigrams per minute.

For purposes of the present invention, the preferred copolymer is a copolymer of ethylene-ethyl acrylate, generally having about one to about 50 percent by weight combined ethyl acrylate, preferably having about 2 to about 30 percent by weight combined ethyl acrylate.

As stated, the production of a silane modified copolymer of an alkylene-alkyl acrylate is carried out by reacting a polysiloxane, as described, with a copolymer of an alkylene-alkyl acrylate.

The amount of polysiloxane used can vary from about 0.05 to about 10 and preferably about 0.3 to about 5 percent by weight based on the weight of the copolymer. If necessary, to accelerate the reaction, additional organo titanate can be added to the reaction mixture.

The temperature at which this reaction is carried out is not critical and can vary, conveniently, from about 80° C. to about 300° C. and preferably from about 150° C. to about 230° C.

The reaction can be carried out at atmospheric, subatmospheric or superatmospheric pressure, although atmospheric pressure is preferred and in the presence of solvents as previously described.

Completion of the reaction is evidenced by measurement of no further viscosity change.

Recovery of the silane modified copolymer is effected by allowing the contents of the reaction flask to cool and discharging to a suitable receiver for storage preferably under an inert gas blanket.

The reaction can be carried out in any suitable apparatus, preferably an apparatus in which the copolymer is subjected to mechanical working such as a Brabender mixer, a Banbury mixer or an extruder. The polysiloxane can be added to the fluxed copolymer and additional organo titanate, if desired, then added. Alternatively, additional organo titanate, if desired, can be added to the copolymer prior to the addition of the polysiloxane or vice versa.

The reaction between the alkylene-alkyl acrylate copolymer and the polysiloxane may be depicted by the following equation:

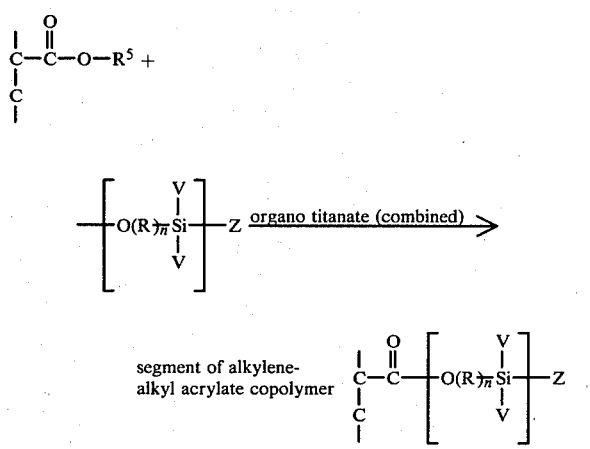

wherein the variables are as previously defined and the silicon containing unit is present in an amount of at least about 0.05 percent by weight, generally about 0.1 to about 10 percent by weight and preferably about 0.3 to about 5 percent by weight based on the total weight of the modified copolymer.

The curing or crosslinking of the silane modified alkylene-alkyl acrylate copolymer is effected by exposing the copolymer to moisture. The moisture present in the atmosphere is usually sufficient to permit curing over a period of 48 hours.

The rate of curing, in a matter of 30 minutes, can be accelerated by exposure to an artifically humidified atmosphere or immersion in water, and heating to elevated temperatures or by exposure to steam.

Generally, curing is effected at temperatures on the order of about 23° C. to about 100° C., preferably about 70° C. to about 100° C.

Alternatively, a wide variety of materials which function as silanol condensation catalysts and which are known in the art can be employed in the crosslinking process and can be added during preparation of the silane modified copolymer. Such materials include metal carboxylates described in my copending application Ser. No. 192,319 filed Sept. 30, 1980, now U.S. Pat. 4,328,323, organic bases such as ethylamine, hexylamine, dibutylamine and piperidine and the like and acids such as mineral acids and fatty acids and the like.

To the silane modified copolymers may be added various additives, in amounts well known in the art, such as fillers among which can be mentioned carbon black, clay, talc, calcium silicate, calcium carbonate, silica, aluminum hydroxide and the like, antioxidants such as 1,2-dihydro-2,3,4-trimethyl quinoline and the like.

The silane modified copolymers can be rendered flame retardant by the addition thereto of halogen containing flame retardants such as pentabromodiphenyl oxide, octabromodiphenyl oxide, decabromodiphenyl oxide, chlorinated polyethylene, polyvinyl chloride and halogenated paraffin waxes, alone, or in admixture with organic or inorganic antimony compounds such as antimony oxide and/or alkaline earth metal oxides, carbonates, hydroxides and sulfates. Among such alkaline earch metal compounds can be noted calcium oxide, calcium carbonate, calcium hydroxide, calcium sulfate, magnesium oxide, magnesium carbonate, magnesium hydroxide and magnesium sulfate.

The following examples further illustrate the present invention and are not intended to limit the scope thereof.

EXAMPLE 1

A. Preparation of Polysiloxane

The reaction scheme for the preparation of the polysiloxane can be depicted, ideally, as follows wherein the silane monomer was acetooxyethyltrimethoxy silane:

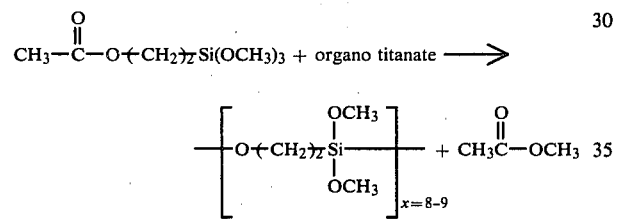

One hundred and four grams (0.5 mole) of acetooxyethyltrimethoxy silane were placed in a 250 ml. three-necked, round bottom flask and heated to a temperature of 75° C. under a nitrogen gas atmosphere. When the contents of the flask reached a temperature of 75° C., 1.191 grams of tetraisopropyl titanate were added thereto using a syringe. The reaction mixture was heated for three hours at a temperature of 95° C. - 110° C. Volatiles evolved during the reaction and were condensed in a dry ice trap. At the end of the three hour period, the contents of the flask were cooled to room temperature, about 23° C., the residue removed from the flask, weighed and stored under argon.

| YIELD | ACTUAL | THEORETICAL | PERCENT OF THEORETICAL |
|---|---|---|---|
| Volatiles | 32.9 grams | 37 grams | 87 |
| Polysiloxane Product | 69.0 grams | 71.8 grams | 96 |
| Viscosity of polysiloxane Product - 3.4 poise | | | |
| Infrared Analysis | | | |
| Volatiles | strong absorption at 1685 reciprocal centimeters which is consistent with strong adsorption at 1690 reciprocal centimeters for a known sample of methyl acetate. | | |
| Polysiloxane Product | strong absorption at 1080 reciprocal centimeters which is consistent with Si—O—CH3 group; weak absorption at 1692 reciprocal centimeters which is consistent with significant reduction of carbonyl groups | | |
| Value of n as 8-9 is consistent with viscosity of product and | | | |

| YIELD | ACTUAL | THEORETICAL | PERCENT OF THEORETICAL |
|---|---|---|---|
| amount of volatiles recovered. | | | |

B. Preparation of Silane Modified Copolymer of Ethylene-Ethyl Acrylate

To a 300 cc Brabender mixer heated to a temperature of 160° C. and maintained under a blanket of argon gas, there was added 244 grams of a copolymer of ethylene-ethyl acrylate, having a melt index of 1.2 and containing 16 percent by weight combined ethyl acrylate and 1.26 grams of 1,2-dihydro-2,3,4-trimethyl quinoline, an antioxidant. This mixture was fluxed and mixed rapidly for 2 minutes. To the fluxed mixture, there was added, by means of a syringe, 5.80 grams of a mixture of the polysiloxane of (a) and dibutyltin dilaurate. The 5.80 gram mixture contained 97 percent by weight polysiloxane and 3 percent by weight dibutyltin dilaurate. After homogeneity was reached in the Brabender, as indicated by a constant torque measurement, 1.26 grams of tetraisopropyl titanate were added to the contents of the Brabender. The contents of the Brabender were then maintained at a temperature of 160°-170° C. for a period of 30 minutes resulting in a reaction whereby the silane reacted with the ethylene-ethyl acrylate copolymer as evidenced by an increase in torque. Volatiles which evolved during the reaction were condensed in a dry ice trap which was connected to the Brabender. At the end of the 30 minute period, the contents of the Brabender were discharged into a polyethylene bag under an atmosphere of argon.

The volatiles which were collected weighed 0.03 grams.

EXAMPLE 2

This example was conducted in the same manner as Example 1 with the exception that no addition tetraisopropyl titanate was used. The reactants and amounts thereof were as follows:

| | |
|---|---|
| Ethylene-ethyl acrylate copolymer (same as used in Example 1) | 246 grams |
| 1,2-dihydro-2,3,4-trimethyl quinoline | 1.26 grams |
| Polysiloxane (prepared as described in Example 1A) | 5.80 grams |
| The volatiles which were collected weighed | 0.03 grams. |

CONTROL 1

To a 300 cc Brabender mixer heated to a temperature of 160° C. and maintained under a blanket of argon gas, there was added 241 grams of a copolymer of ethylene-ethyl acrylate having a melt index of 1.2 and containing 16 percent by weight combined ethyl acrylate and 1.26 grams of 1,2-dihydro-2,3,4-trimethyl quinoline. This mixture was fluxed and mixed rapidly for 2 minutes. To the fluxed mixture, there was added, by means of a syringe, 8.84 grams of of a mixture of acetooxyethyl-trimethoxy silane

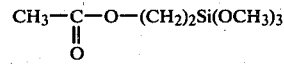

and dibutyltin dilaurate. The 8.84 gram mixture contained 97 percent by weight acetooxyethyltrimethoxy silane and 3 percent by weight dibutyltin dilaurate. After homogeniety was reached in the Brabender, as indicated by a constant torque measurement, 1.26 grams of tetraisopropyl titanate were added to the contents of the Brabender. The contents of the Brabender were then maintained at a temperature of 160°–170° C. for a period of thirty minutes resulting in a reaction whereby the silane reacted with the ethylene-ethyl acrylate copolymer. Volatiles which evolved during the reaction were condensed in a dry ice trap which was connected to the Brabender. At the end of the thirty minute period, the contents of the Brabender were discharged into a polyethylene bag under an atmosphere of argon.

The volatiles which were collected weighed 3.01 grams.

20 gram samples of silane modified copolymers of Example 1, Example 2 and Control 1 were pressed into plaques of the following dimensions: 3 inches × 3 inches ×.075 inch in a five minute cycle at a temperature of 110° C.–115° C. under a pressure of 5000 psig.

The plaques were cured by being suspended in water, which was at a temperature of 90° C., for three hours. After the three hour water-cure, the plaques were removed from the water, wiped dry and placed in a vacuum oven, which was at a temperature of 50° C., for one hour in order to insure removal of residual water.

The plaques were then measured for degree of crosslinking, according to the Monsanto Rheometer test. This test procedure is described, more fully, in U.S. Pat. No. 4,018,852 to Donald L. Schober, granted Apr. 19, 1977. FIG. 1 of the drawing of this patent shows the typical Rheometer curve. The level of vulcanization or crosslinking is designated as H and is measured in terms of inch-pounds of torque on the Rheometer test equipment.

Results with respect to the plaques tested are as follows:

|  | Average of (2) Plaques Tested |
| --- | --- |
| Plaques of Example 1 | 53 inch-pounds |
| Plaques of Example 2 | 53 inch-pounds |
| Plaques of Control 1 | 53 inch-pounds |

Results show that a copolymer reacted with a polysiloxane has the same degree of crosslinking, with evolution of significantly less volatiles, than a copolymer reacted with a monomeric silane.

EXAMPLE 3

This example illustrates the preparation of a polysiloxane using an end blocker.

A three liter flask was charged with 2140 grams (10.29 moles) of acetooxyethyltrimethoxy silane, 154 grams (1.03 moles) of ethyl benzoate and the contents of the flask brought to a temperature of 85° C. To this mixture, there was then added 21 grams of tetraisopropyl titanate. The solution, kept under an argon gas atmosphere, was stirred while being heated for 5¾ hours at a temperature of 94° C.–125° C. During this period of time, 752 grams of volatiles were collected in an acetone dry ice trap. This was 98.8 percent of the theoretical amount of methyl acetate, based on 100 percent conversion. The polysiloxane product recovered weighed 1543 grams, 99.3 percent of the theoretical yield. Viscosity of the product was 1.4 poise. An idealized equation for the preparation is as follows:

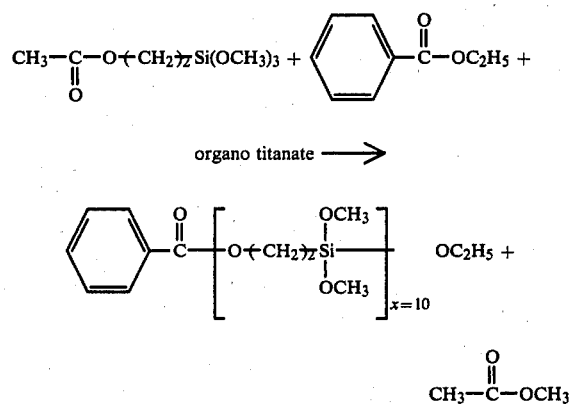

EXAMPLE 4

Example 3 was repeated using the same reactants, same molar amounts and same reaction conditions with the exception that acetooxyethylmethyldimethoxy silane was used as the monomeric silane. Viscosity of the product was 1.4 poise.

EXAMPLE 5

Into a flask equipped with a distillation head and heating mantle, there was placed 62.5 grams (0.3 mole) acetooxyethyltrimethoxy silane and 85.3 grams (0.3 mole) tetraisopropyl titanate. The contents of the flask were heated to a temperature of 120° C., at atmospheric pressure, under a nitrogen gas atmosphere during which time 18.5 grams of a mixture of methyl acetate and isopropyl acetate was removed. The contents of the flask were maintained at a temperature at 120° C. for an additional one hour during which time the pressure was reduced to 50 mm. Over this period of time, an additional 9 grams of a mixture of methyl acetate and isopropyl acetate were removed.

| Analysis of the distillate (total of 27.5 grams) | |
| --- | --- |
| methyl acetate | 15.6 grams |
| isopropyl acetate | 10.1 grams |
| methanol | 1.0 gram |

Nuclear Magnetic Resonance analysis of the polymeric material recovered from the flask indicated a polysiloxane containing a repeating unit of the formuls:

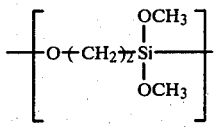

and containing about 30 percent by weight of the original organo titanate chemically combined therein. About 70 percent by weight of th organo titanate, i.e., tetraisopropyl titanate was recovered from the flask.

EXAMPLE 6

Into a flask containing 86 grams of the polysiloxane of Example 1A, there was added, dropwise, 14 grams of tetraisopropyl titanate during which time the temperature of the contents of the flask rose from 25° C. to 40° C.

Analysis of recovered product by Nuclear Magnetic Resonance established that the polysiloxane contained chemically combined organo titanate.

The silane modified copolymers of alkylene-alkyl acrylates, although described primarily for use as insulation, can also be used as jacketing about industrial cables, telephone wires and cables and also as semi-conductive coatings.

Comparable results were achieved using, in place of the ethylene-ethyl acrylate copolymer, a copolymer of ethylene-ethylacrylate-t-butylacrylate.

Also comparable results were achieved using as an end blocker, an ethylene-ethyl acrylate copolymer containing 2.5 percent by weight combined ethyl acrylate.

What is claimed is:

1. A polysiloxane, reactive with alkylene-alkyl acrylate copolymer, containing the repeating unit:

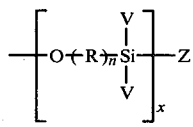

wherein R is a hydrocarbon radical or an oxy substituted hydrocarbon radical, each V is hydrogen, a hydrocarbon radical or a hydrolyzable group, Z is a hydrolyzable group, n is an integer having a value of 1 to 18 inclusive and x is an integer having a value of at least 2, said polysiloxane end blocked by an ester group and containing an organo titanate chemically combined therewith.

2. A polysiloxane as defined in claim 1 wherein R is an alkylene radical having 1 to 18 carbon atoms inclusive.

3. A polysiloxane as defined in claim 1 wherein each V is an alkoxy radical having 1 to 18 carbon atoms inclusive.

4. A polysiloxane as defined in claim 1 wherein Z is an alkoxy radical having 1 to 18 carbon atoms.

5. A polysiloxane as defined in claim 1 wherein the organo titanate is tetraisopropyl titanate or tetrabutyl titanate.

6. A polysiloxane as defined in claim 1 wherein R is —CH$_2$CH$_2$—, and V and Z are methoxy.

7. A polysiloxane as defined in claim 6 wherein the organo titanate is tetraisopropyl titanate or tetrabutyl titanate.

8. A polysiloxane as defined in the claim 1 wherein R is—CH$_2$CH$_2$—, Z is methoxy, V is methoxy and dodecoxy.

9. A polysiloxane as defined in claim 8 wherein the organo titanate is tetraisopropyl titanate or tetrabutyl titanate.

10. A polysiloxane as defined in claim 1 wherein R is —CH$_2$CH$_2$—, Z is methoxy, and V is alkyl and methoxy.

11. A polysiloxane as defined in claim 10 wherein the organo titanate is tetraisopropyl titanate or tetrabutyl titanate.

12. A polysiloxane as defined in claim 1 wherein x has a value of 5 to 25 inclusive.

13. A polysiloxane as defined in claim 1 end blocked by a compound having the formula:

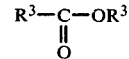

wherein each R$^3$ is a hydrocarbon radical.

14. A process of producing a polysiloxane, reactive with an alkylene-alkyl acrylate copolymer and containing an organo titanate chemically combined therewith, which comprises reacting a mixture consisting essentially of an organo titanate and a silane having the formula:

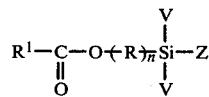

wherein R is a hydrocarbon radical or an oxy substituted hydrocarbon radical, R$^1$ is a hydrocarbon radical, each V is hydrogen, a hydrocarbon radical or a hydrolyzable group, Z is a hydrolyzable group and n is an integer having a value of 1 to 18 inclusive.

15. A process as defined in claim 14 wherein the organo titanate is present in an amount of about 0.001 to about 25 percent by weight based on the weight of the said silane.

16. A process as defined in claim 14 conducted at a temperature of about 0° C. to about 250° C.

17. A process as defined in claim 14 wherein the organo titanate has the formula:

wherein each R$^2$ is a hydrocarbon radical.

18. A process as defined in claim 14 wherein an ester end blocker is present.

19. A process as defined in claim 14 wherein an end blocker having the formula:

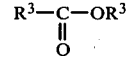

wherein each R$^3$ is a hydrocarbon radical is present.

20. A polysiloxane as defined in claim 1 end blocked by ethyl benzoate or methyl benzoate.

21. A polysiloxane as defined in claim 1 end blocked by ethyl benzoate, wherein the organo titanate is tetraisopropyl titanate and the polysiloxane is derived from acetooxyethyltrimethoxy silane or acetooxyethylmethyldimethoxy silane.

* * * * *

UNITED STATES PATENT AND TRADEMARK OFFICE
CERTIFICATE OF CORRECTION

PATENT NO. : 4,404,349
DATED : September 13, 1983
INVENTOR(S) : Michael J. Keogh It is certified that error appears in the above—identified patent and that said Letters Patent is hereby corrected as shown below:

| | |
|---|---|
| Column 2, line 10; | "cam" should read --can--. |
| Column 3, line 44; | "of" should read --or--. |
| Column 7, last line; | "n" should read --x--. |
| Column 8, lines 1-4; | the heading "Yield Actual Theoretical Percent of Theoretical" should be deleted. |
| Column 8, line 39; | "addition" should read --additional--. |
| Column 8, line 60; | "of of" should read --of--. |
| Column 10, line 36; | "at 120°C" should read --of 120°C--. |
| Column 10, line 50; | "formuls" should read --formula--. |
| Column 10, line 62; | "th" should read --the--. |
| Claim 1, line 1; | "with" should read --with an--. |

Signed and Sealed this

Twenty-fourth Day of January 1984

[SEAL]

Attest:

GERALD J. MOSSINGHOFF

Attesting Officer

Commissioner of Patents and Trademarks